(12) United States Patent
Minamiguchi et al.

(10) Patent No.: US 9,184,686 B2
(45) Date of Patent: Nov. 10, 2015

(54) ELECTRIC POWER GENERATION CONTROL DEVICE AND ELECTRIC POWER GENERATION CONTROL SYSTEM

(71) Applicant: DENSO CORPORATION, Kariya, Aichi-pref. (JP)

(72) Inventors: Yuuichi Minamiguchi, Okazaki (JP); Isao Ookawa, Kariya (JP); Katsuyuki Mori, Ichinomiya (JP); Akihiko Yagyu, Kariya (JP)

(73) Assignee: DENSO CORPORATION, Kariya, Aichi-pref.

( * ) Notice: Subject to any disclaimer, the term of this patent is extended or adjusted under 35 U.S.C. 154(b) by 60 days.

(21) Appl. No.: 14/136,338

(22) Filed: Dec. 20, 2013

(65) Prior Publication Data

US 2014/0183878 A1    Jul. 3, 2014

(30) Foreign Application Priority Data

Dec. 28, 2012 (JP) .................. 2012-287521

(51) Int. Cl.
| | |
|---|---|
| *H02P 9/04* | (2006.01) |
| *B60W 30/20* | (2006.01) |
| *H02J 7/14* | (2006.01) |
| *B60W 10/06* | (2006.01) |
| *B60W 10/30* | (2006.01) |
| *B60W 50/00* | (2006.01) |

(52) U.S. Cl.
CPC .................. *H02P 9/04* (2013.01); *B60W 10/06* (2013.01); *B60W 10/30* (2013.01); *B60W 30/20* (2013.01); *H02J 7/1446* (2013.01); *B60W 2030/206* (2013.01); *B60W 2050/0056* (2013.01); *B60W 2510/244* (2013.01); *B60W 2710/083* (2013.01); *B60W 2710/244* (2013.01); *Y02T 10/92* (2013.01)

(58) Field of Classification Search
None
See application file for complete search history.

(56) References Cited

U.S. PATENT DOCUMENTS

| | | | |
|---|---|---|---|
| 5,270,575 A | 12/1993 | Togai et al. | |
| 2002/0047686 A1* | 4/2002 | Kodama et al. | ............... 320/130 |
| 2005/0143896 A1 | 6/2005 | Sawada et al. | |
| 2005/0200088 A1 | 9/2005 | Sawada et al. | |

(Continued)

FOREIGN PATENT DOCUMENTS

| | | |
|---|---|---|
| DE | 19532163 | 3/1997 |
| DE | 102008023837 | 1/2009 |

(Continued)

OTHER PUBLICATIONS

Official Communication issued Apr. 29, 2014 in corresponding EP Application No. 13194978.6.

(Continued)

*Primary Examiner* — Rami Khatib
(74) *Attorney, Agent, or Firm* — Harness, Dickey & Pierce, P.L.C.

(57) ABSTRACT

An ECU in an electric power generation control system obtains a vehicle state containing a battery state and a driving state of a motor vehicle. The ECU calculates charging parameters necessary for maintaining a residual charge of a battery and vibration suppression parameters necessary for suppressing vibration of a vehicle. An exciting current setting section as a function of the ECU determines an exciting current flowing in an excitation winding of an alternator on the basis of the charging parameters and the vibration suppression parameters.

8 Claims, 13 Drawing Sheets

(56) References Cited

U.S. PATENT DOCUMENTS

| | | |
|---|---|---|
| 2009/0071736 A1 | 3/2009 | Mori et al. |
| 2011/0190970 A1* | 8/2011 | Moriya et al. .................. 701/22 |
| 2012/0075763 A1* | 3/2012 | Sieber .......................... 361/93.9 |

FOREIGN PATENT DOCUMENTS

| | | |
|---|---|---|
| EP | 0 645 278 | 3/1995 |
| EP | 2 036 794 | 3/2009 |
| JP | 04-197100 | 7/1992 |
| JP | 2002-135991 | 5/2002 |
| JP | 2005-188324 | 7/2005 |
| JP | 2005-256636 | 9/2005 |
| JP | 2008-289318 | 11/2008 |
| JP | 2009-090968 | 4/2009 |
| JP | 2010-166663 | 7/2010 |
| JP | 2010-173474 | 8/2010 |
| JP | 2013-253592 | 12/2013 |
| JP | 2014-134169 | 7/2014 |
| JP | 2014-135867 | 7/2014 |
| WO | WO 91/08612 | 6/1991 |
| WO | WO 2006/064335 | 6/2006 |
| WO | WO2013/168808 | 11/2013 |

OTHER PUBLICATIONS

Office Action dated Nov. 25, 2014 in corresponding Japanese Application No. 2012-287521.

* cited by examiner

ELECTRIC POWER GENERATION CONTROL DEVICE AND ELECTRIC POWER GENERATION CONTROL SYSTEM

CROSS-REFERENCE TO RELATED APPLICATION

This application is related to and claims priority from Japanese Patent Application No. 2012-287521 filed on Dec. 28, 2012, the contents of which are hereby incorporated by reference.

BACKGROUND OF THE INVENTION

1. Field of the Invention

The present invention relates to electric power generation devices and systems, mounted on motor vehicles comprised of internal combustion engines, which control a generation of electric power by an alternator driven by an internal combustion engine and a supply of the generated electric power to a battery.

2. Description of the Related Art

There is a known device regarding such a type of the electric power generation control devices. For example, a patent document, Japanese patent No. JP 4483985, has disclosed a device to adjust a driving torque of an alternator to suppress various vibrations of a motor vehicle. In general, various types of vibrations are caused in a motor vehicle, for example, twisting vibration, pitching vibration, vibration of an internal combustion engine, etc. The twisting vibration is caused by twisting a crank shaft and/or a drive shaft of the internal combustion engine mounted to the motor vehicle. The pitching vibration is caused in a pitching direction by a driving force or a brake force.

By the way, in general such an electric power generation control device performs a feedback control of an exciting current flowing in an excitation winding of an alternator by a voltage regulator in order to adjust an electric power generated by the alternator within a predetermined reference voltage. In order to achieve this control, the electric power generation control device disclosed in the patent document No. JP 4483985 adjusts an output current of the alternator by adjusting an exciting current in order to change an amount of generated electric power. However, in order to perform the control of adjusting an exciting current, the conventional electric power generation control device is required to add a specific device.

That is, when a battery having a large electric resistance (charging/discharging resistance), which is generated during electric charging/discharging operation, is mounted to a motor vehicle, it becomes difficult to correctly perform a control of a generation amount of electric power by directly adjusting an output current of the alternator, as previously described, because a charging/discharging resistance is greatly changed according to an amount of a residual capacity (i.e. a residual charge) of the battery. In order to avoid this problem, it is for example necessary to replace the battery with a new battery having a small charging/discharging resistance.

SUMMARY

It is therefore desired to provide an electric power generation control device and an electric power generation control system, to be mounted to a motor vehicle equipped with an internal combustion engine, an alternator and a battery, capable of adjusting an electric power generation of the alternator driven by the internal combustion engine, of controlling the supply of the generated electric power to the battery and of suppressing vibration caused in the motor vehicle, with a simple structure.

An exemplary embodiment provides an electric power generation control device to be mounted to a motor vehicle. The electric power generation control device corresponds to an arithmetic device, i.e. a computer comprised of an electric control unit (ECU). The electric power generation control device controls an electric power generation of an electric power generator, i.e. an alternator when the electric power generator is driven by an internal combustion engine and supplies the electric power to a battery. The electric power generation control device is comprised of a vehicle state obtaining section, a parameter calculation section and an exciting current setting section. The vehicle state obtaining section obtains a battery state of the battery and a vehicle state of the motor vehicle. The parameter calculation section calculates charging parameters $\Delta Dbatt$, $\Delta Tbatt$, $Vrefu$ and vibration suppression parameters $\Delta Da$, $\Delta Ta$. The charging parameters $\Delta Dbatt$, $\Delta Tbatt$, $Vrefu$ are necessary for maintaining a residual capacity, i.e. a residual charge of the battery within a predetermined range. The vibration suppression parameters are necessary to suppress vibration cased in the motor vehicle. The exciting current setting section determines an exciting current to be flowing an excitation winding of the electric power generator on the basis of the charging parameters and the vibration suppression parameters.

There are, as the battery state, a voltage and a current of the battery, a voltage and a current outputted from the electric power generator such as an alternator, a temperature of the battery, etc. There are, as the vehicle state, vehicle moving conditions, for example, a vibration vector and a moment of the motor vehicle, a pitching and a rolling amount, etc.

There are, as the charging parameters, the exciting current which is required to maintain the residual capacitor or the residual charge of the battery and a torque which is converted from this exciting current. Further, there are, as the vibration suppression parameters, a torque which is required to suppress vibration caused in the motor vehicle and an exciting current which is converted from this torque.

The electric power generation control device having the structure and functions previously described does not directly control or adjust an output current outputted from the electric power generator, i.e. the alternator. That is, the electric power generation control device having the structure and functions previously described directly controls the exciting current flowing in the excitation winding of the electric power generator, i.e. the alternator on the basis of the charging parameters and the vibration suppression parameters. This makes it possible to correctly control the electric power supply from the electric power generator to the battery and suppress vibration of the motor vehicle with a simple structure.

The electric power generation control device according to an exemplary embodiment is comprised of the vehicle state obtaining section, the parameter calculation section and a filter section. The vehicle state obtaining section obtains a voltage for the battery. The parameter calculation section calculates charging parameters on the basis of the voltage of the battery. The filter section eliminates a high frequency component from the voltage of the battery and/or the charging parameters. It is possible for the parameter calculation section receives the charging parameters without a high frequency component transmitted from the filter section.

In general, a control value has a frequency component which is lower than a frequency component of the vibration suppression parameter, where the frequency component of the control value is one of the charging parameters to be supplied to the electric power generator in order to maintain the residual charge of the battery within the predetermined range. However, when the voltage of the battery is feedback to the charging parameters, there is a possibility of it being affected by the vibration suppression parameters which have a relatively high frequency. In order to avoid this, the filter section eliminates a high frequency component from the charging parameters.

The electric power generation control device having the structure and functions previously described can suppress the battery voltage from being affected by a high frequency component when a feedback control of the battery voltage is performed. This makes it possible to supply an optimum exciting current to the electric power generator, i.e. the alternator with high accuracy.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
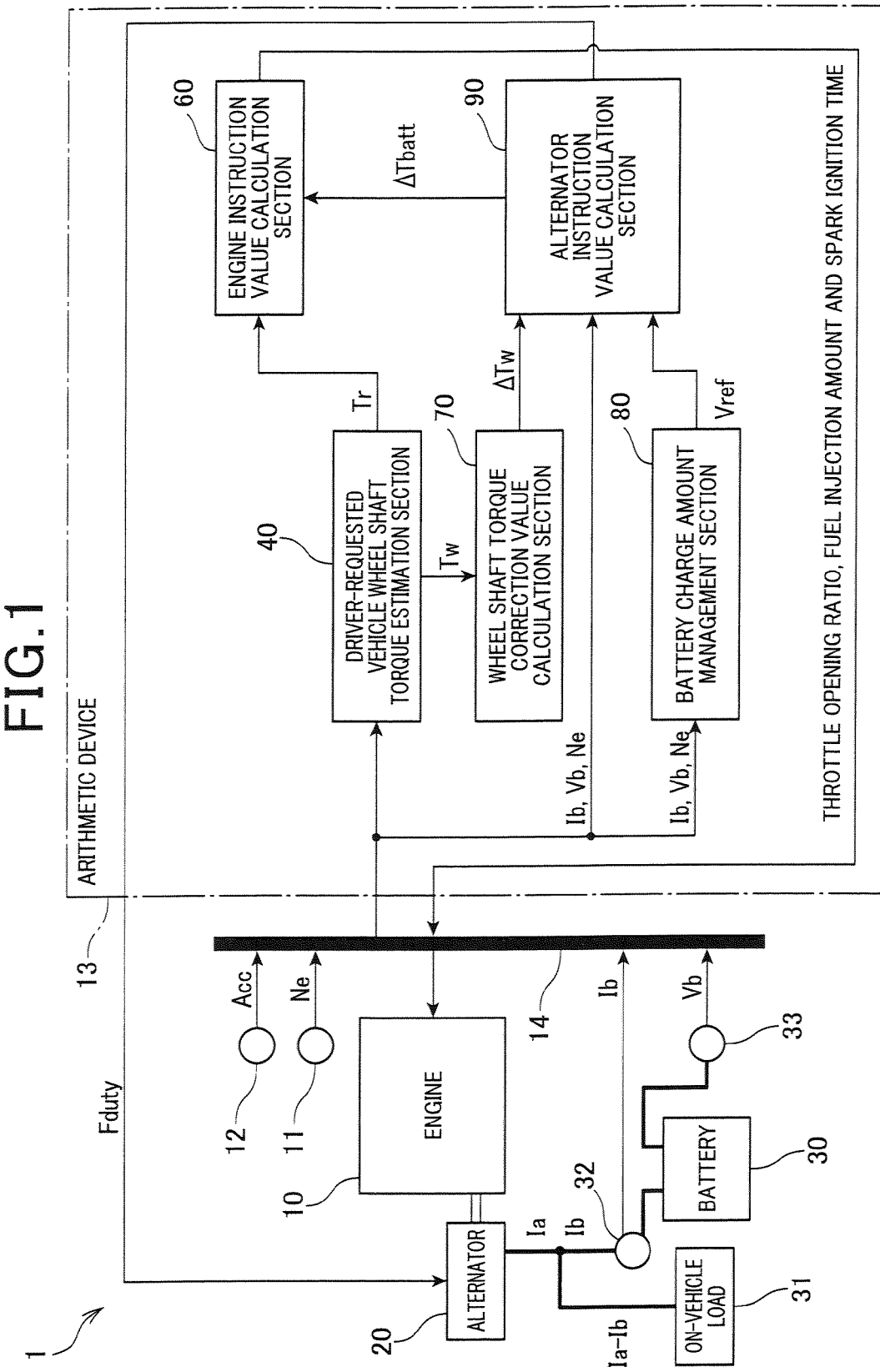
FIG. 1 is a view showing a block diagram showing a structure of an electric power generation control system 1, to be amounted to a motor vehicle, according to a first exemplary embodiment of the present invention in which the electric power generation control system 1 is comprised of a spark ignition engine 10, an alternator 20, a battery 30, and an arithmetic device 13.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of an electric power generation control system 1 according to a first exemplary embodiment with reference to FIG. 1 to FIG. 8.

FIG. 1 is a view showing a block diagram showing a structure of the electric power generation control system 1, to be amounted to a motor vehicle, according to the first exemplary embodiment. As shown in FIG. 1, the electric power generation control system 1 is comprised of a spark ignition engine 10 (hereinafter, the engine 10), an alternator 20, an in-vehicle battery 30 (hereinafter, the battery 30), and an arithmetic device 13. The arithmetic device 13 works as the electric power generation control device.

The ECU 13 is equipped with a computer comprised of a central processing unit (CPU), a read only memory (ROM), a random access memory (RAM), etc. On performing a spark ignition of the engine 10, the ECU 13 calculates engine instruction values such as a spark ignition timing, a fuel injection amount, and an opening ratio of a throttle, and transmits the calculated engine instruction values through a communication bus line 14 to various types of actuators, for example, a spark ignition device, a fuel injection valve, an electrical throttle valve, and etc. When receiving the engine instruction values transmitted from the ECU 13, these actuators operate on the basis of the received engine instruction values.

A crank angle sensor 11, an accelerator sensor 12, a current sensor 32, a voltage sensor 33, and etc. transmit detection values through the communication bus line 14. For example, the crank angle sensor 11 outputs a signal to be used for calculating a rotation speed Ne or an engine rotation speed Ne per predetermined time length of the crank shaft of the engine 10. The accelerator sensor 12 outputs a signal to be used for calculating an amount of depression of an accelerator pedal by a driver of a motor vehicle.

the current sensor 32 outputs a detection value of a terminal current (as a battery current Ib) of the battery 30. The voltage sensor 33 outputs a detection value (as a battery voltage Vb) of a terminal voltage of the battery 30. It can determine whether a charge current or a discharge current on the basis of a sign of the battery current Ib.

Further, the ECU 13 calculates an instruction value regarding a duty ratio Fduty of the exciting current in an excitation winding of the alternator 20, which will be explained later, and outputs the instruction value regarding the duty ratio Fduty of the exciting current to the alternator 20 through a communication section (not shown).

Specifically, when an electric power generation voltage (which corresponds to the battery voltage Vb) is lower than a predetermined voltage Va, the ECU 13 increases the duty ratio Fduty of the exciting current to increase the exciting current in the excitation winding of the alternator 20. This makes it possible to increase the electric power generation amount of the alternator 20. On the other hand, when an electric power generation voltage is higher than the predetermined voltage Va, the ECU 13 decreases the duty ratio Fduty of the exciting current to decrease the exciting current in the excitation winding of the alternator 20.

This makes it possible to decrease the electric power generation amount of the alternator 20. As previously explained, it is possible to maintain the electric power generation voltage to an adjustment voltage Va even if a rotation speed of the alternator 20 is changed and the electric power generation amount of the alternator 20 varies per predetermined time length.

The ECU 13 determines the duty ratio Fduty of the exciting current in order to maintain the residual capacity of the battery 30 within a specified range. That is, when the residual capacity of the battery 30 becomes not more than a predetermined range, the ECU 13 increases the duty ratio Fduty of the exciting current to increase the exciting current in the excitation winding of the alternator 20. This makes it possible to increase the electric power generation amount of the alternator 20, and to quickly charge the battery 30 within the predetermined range.

On the other hand, when the residual capacity of the battery 30 exceeds the predetermined range, the ECU 13 decreases the duty ratio Fduty for the exciting current in order to decrease the amount of the exciting current flowing in the excitation winding of the alternator 20. This makes it possible to avoid the battery 30 from being over-charged state. That is, the ECU 13 determines or adjusts the duty ratio Fduty of the exciting current in order to maintain the residual capacity (or residual charge) of the battery 30 within the predetermined range.

Because it can be understood that a drive torque of the alternator 20 is a load of the engine 10, it is possible to correctly suppress the vibration of a motor vehicle by adjusting the electric power generation amount of the alternator 20 on the basis of a request torque of the ECU 13 as the arithmetic device 13 which has a function of suppressing the vibration of the motor vehicle. Accordingly, the ECU 13 as the arithmetic device according to the first exemplary embodiment calculates a drive torque (as a corrected torque) which is necessary to suppress the vibration of the motor vehicle, and calculates the duty ratio Fduty of the exciting current to provide the corrected torque.

As shown in FIG. 1, the arithmetic device 13 has functional sections, for example a driver-requested wheel shaft torque estimation section 40, an engine instruction value calculation section 60, a wheel shaft torque correction value calculation section 70, a battery charge amount management section 80, an alternator instruction value calculation section 90, etc. These functional sections 40, 60, 70 80 and 90 calculate the engine instruction values and the duty ratio Fduty of the exciting current.

Figure 2:
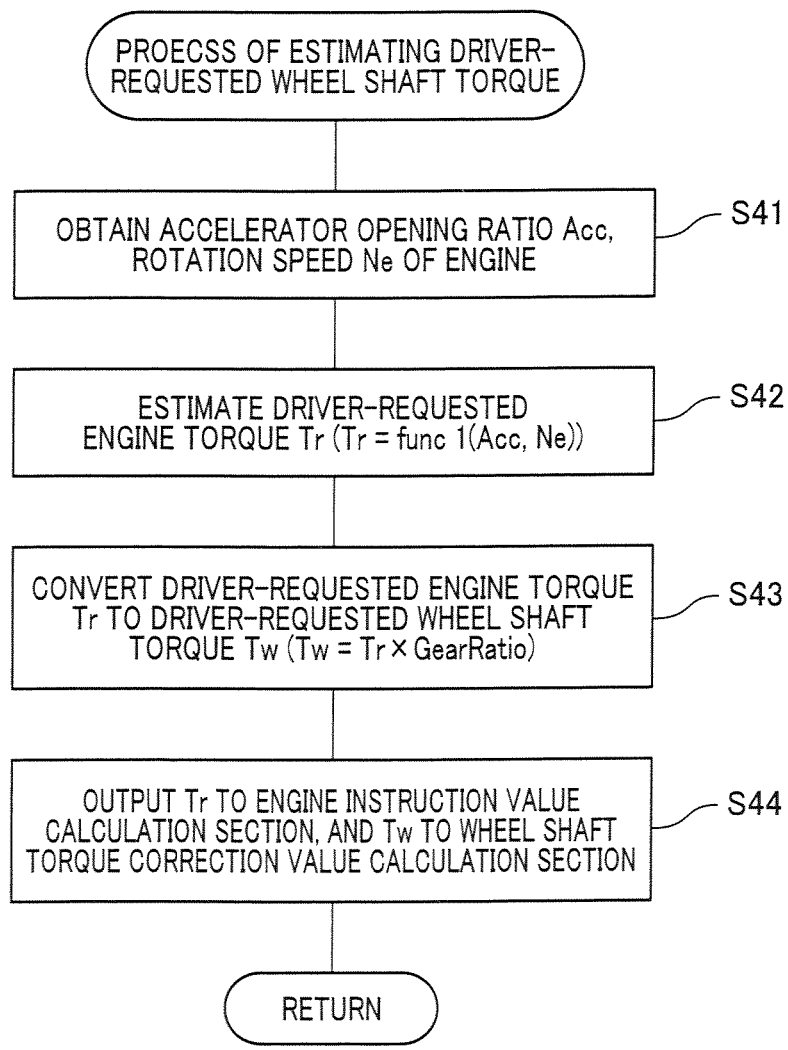
FIG. 2 is a view showing a flow chart of a torque estimation process for estimating a driver-requested torque of a wheel shaft performed by an arithmetic device 13 which works as a driver-requested wheel shaft torque estimation section 40 according to the first exemplary embodiment shown in FIG. 1.

FIG. 2 is a view showing a flow chart of a torque estimation process for estimating a driver-requested torque of the wheel shaft performed by the arithmetic device 13 which works as a driver-requested wheel shaft torque estimation section 40 according to the first exemplary embodiment shown in FIG. 1.

The driver-requested wheel shaft torque estimation section 40 repeatedly performs the routine indicated by the flow chart shown in FIG. 2 to calculate a driver-requested engine torque Tr and a driver-requested wheel shaft torque Tw every predetermined torque. That is, as shown in FIG. 2, the driver-requested wheel shaft torque estimation section 40 in the arithmetic device 13 obtains an engine speed Ne and an accelerator opening ratio Acc through the communication bus line 41 in step S41. The operation flow goes to step S42.

In step S42, the driver-requested wheel shaft torque estimation section 40 estimates the engine torque Tr which is requested by the driver of the motor vehicle on the basis of a function func1, the engine rotation speed Ne and the accelerator opening ratio Acc. Specifically, the driver-requested wheel shaft torque estimation section 40 converts the accelerator opening ratio Acc to a throttle opening ratio, and calculates an engine load on the basis of the throttle opening ratio and the engine rotation speed Ne by using a predetermined map. Further, the driver-requested wheel shaft torque estimation section 40 calculates a driver-requested engine torque Tr on the engine load and the engine rotation speed Ne by using a predetermined map. The operation flow goes to step S43.

In step S43, the driver-requested wheel shaft torque estimation section 40 converts the driver-requested engine torque Tr to the drive shaft torque Tw. Specifically, the driver-requested wheel shaft torque estimation section 40 calculates the driver-requested drive shaft torque Tw by multiplying a gear ratio and the driver-requested engine torque Tr, where the gear ratio includes a differential gear and obtained from the crank shaft to the wheel shaft. The driver-requested wheel shaft torque estimation section 40 outputs the driver-requested drive shaft torque Tw to the engine instruction value calculation section 60. At the same time, the driver-requested wheel shaft torque estimation section 40 also outputs the driver-requested drive shaft torque Tw to the wheel shaft torque correction value calculation section 70. The driver-requested wheel shaft torque estimation section 40 completes the routine indicated by the flow chart shown in FIG. 2.

Figure 3:
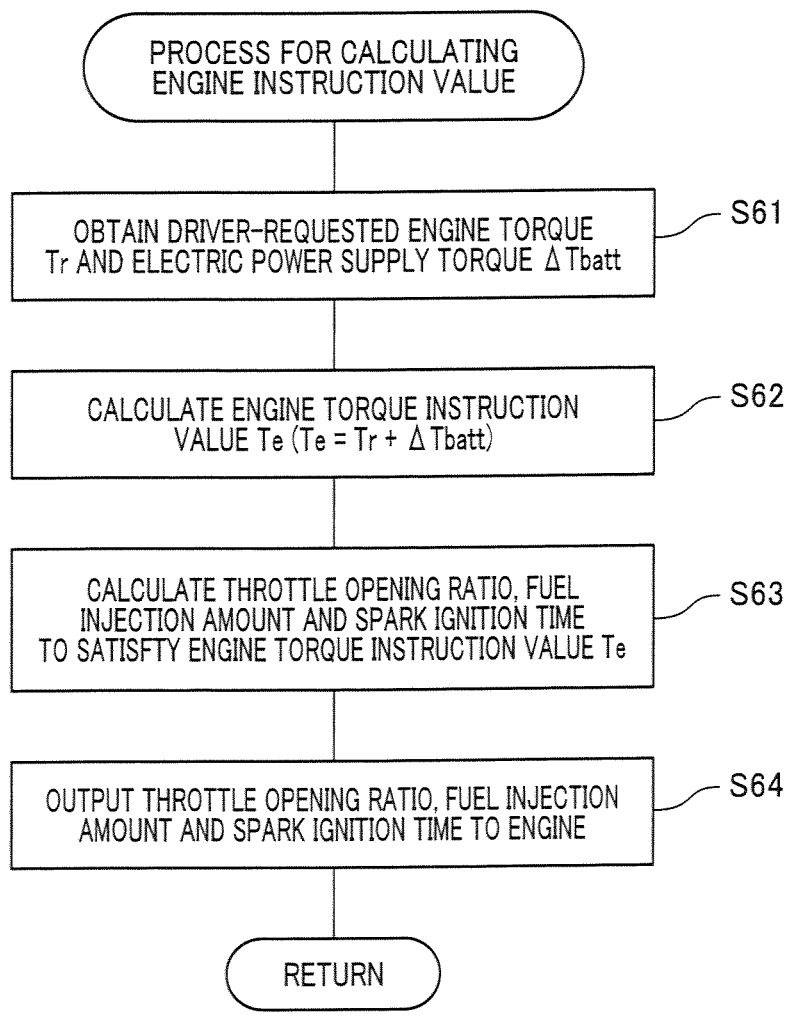
FIG. 3 is a view showing a flow chart of a process for calculating engine instruction values by the arithmetic device 13 which works as an engine instruction value calculation section 60 according to the first exemplary embodiment shown in FIG. 1.

FIG. 3 is a view showing a flow chart of a process for calculating engine instruction values by the arithmetic device 13 which works as an engine instruction value calculation section 60 according to the first exemplary embodiment shown in FIG. 1.

The engine instruction value calculation section 60 repeatedly calculates the engine instruction values previously described according to the routine designated by the flow chart shown in FIG. 3.

That is, as shown in FIG. 3, the engine instruction value calculation section 60 obtains the driver-requested engine torque Tr and a consumption electric power torque ΔTbatt in step S61. This consumption electric power torque ΔTbatt indicates an engine output torque corresponding to electric power which is consumed by the on-vehicle device 31 as the load. The consumption electric power torque ΔTbatt is obtained by an alternator instruction value calculation process which will be explained later. The operation flow goes to step S62.

In step S62, the engine instruction value calculation section 60 adds the obtained driver-requested engine torque Tr and the consumption electric power torque ΔTbatt to calculate the engine torque instruction value Te. That is, the engine instruction value calculation section 60 increases an accelerator pedal operation by the driver of the motor vehicle by an electric load (variable) of the on-vehicle device 31 to calculate the engine torque instruction value Te. The operation flow goes to step S63.

In step S63, the engine instruction value calculation section 60 calculates a throttle opening ratio, a fuel injection amount and an spark ignition timing by using a predetermined map in order to achieve the calculated engine torque instruction value Te. The operation flow goes to step S64.

In step S64, the engine instruction value calculation section 60 outputs the calculated throttle opening ratio, the calculated fuel injection amount and the calculated spark ignition timing through the communication bus line 14. The engine instruction value calculation section 60 completes the routine indicated by the flow chart shown in FIG. 3. The various actuators for the engine 10 as previously described receive these engine instruction values through the communication bus line 14 and operate on the basis of the received engine instruction values.

Figure 4:
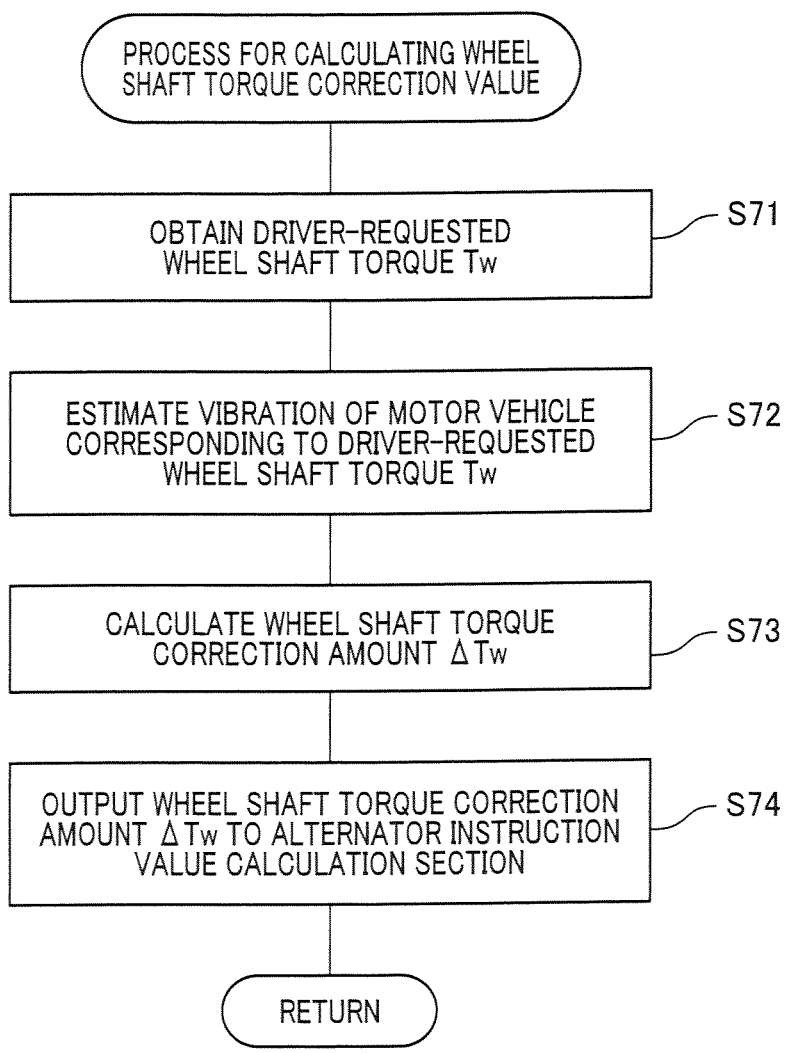
FIG. 4 is a view showing a flow chart of a process of calculating a correction value of the wheel shaft torque performed by the arithmetic device 13 which works as a wheel shaft torque correction value calculation section 70 according to the first exemplary embodiment shown in FIG. 1.

FIG. 4 is a view showing a flow chart of a process of calculating a correction value of the wheel shaft torque performed by the arithmetic device 13 which works as a wheel shaft torque correction value calculation section 70 according to the first exemplary embodiment shown in FIG. 1.

As shown in FIG. 4, the wheel shaft torque correction value calculation section 70 repeatedly performs the routine indicated by the flow chart shown in FIG. 4 in order to calculate a wheel shaft torque as a wheel shaft torque correction value $\Delta Tw$. That is, as shown in FIG. 4, in step S71, the wheel shaft torque correction value calculation section 70 obtains the driver-requested drive shaft torque Tw as previously described. The operation flow goes to step S72.

In step S72, the wheel shaft torque correction value calculation section 70 estimates a vibration state of the motor vehicle on the basis of the driver-requested drive shaft torque Tw by using a predetermined map. The operation flow goes to step S73.

In step S73, the wheel shaft torque correction value calculation section 70 calculates the wheel shaft torque correction value $\Delta Tw$ on the basis of the estimated vibration state of the motor vehicle. During the process in step S72 and the process in step S73, for example, it is possible for the wheel shaft torque correction value calculation section 70 to calculate the wheel shaft torque correction value $\Delta Tw$ by using a method disclosed in the patent document No. JP 4483985, as previously explained. The operation flow goes to step S74.

The wheel shaft torque correction value $\Delta Tw$ corresponds to a drive torque of the alternator 20 in order to suppress vibration of the motor vehicle. The wheel shaft torque correction value $\Delta Tw$ is added to determine the adjustment voltage instruction value Va. In step S74, the wheel shaft torque correction value calculation section 70 outputs the calculated wheel shaft torque correction value $\Delta Tw$ to the alternator instruction value calculation section 90. The wheel shaft torque correction value calculation section 70 completes the execution of the routine designated by the flow chart shown in FIG. 4.

Figure 5:
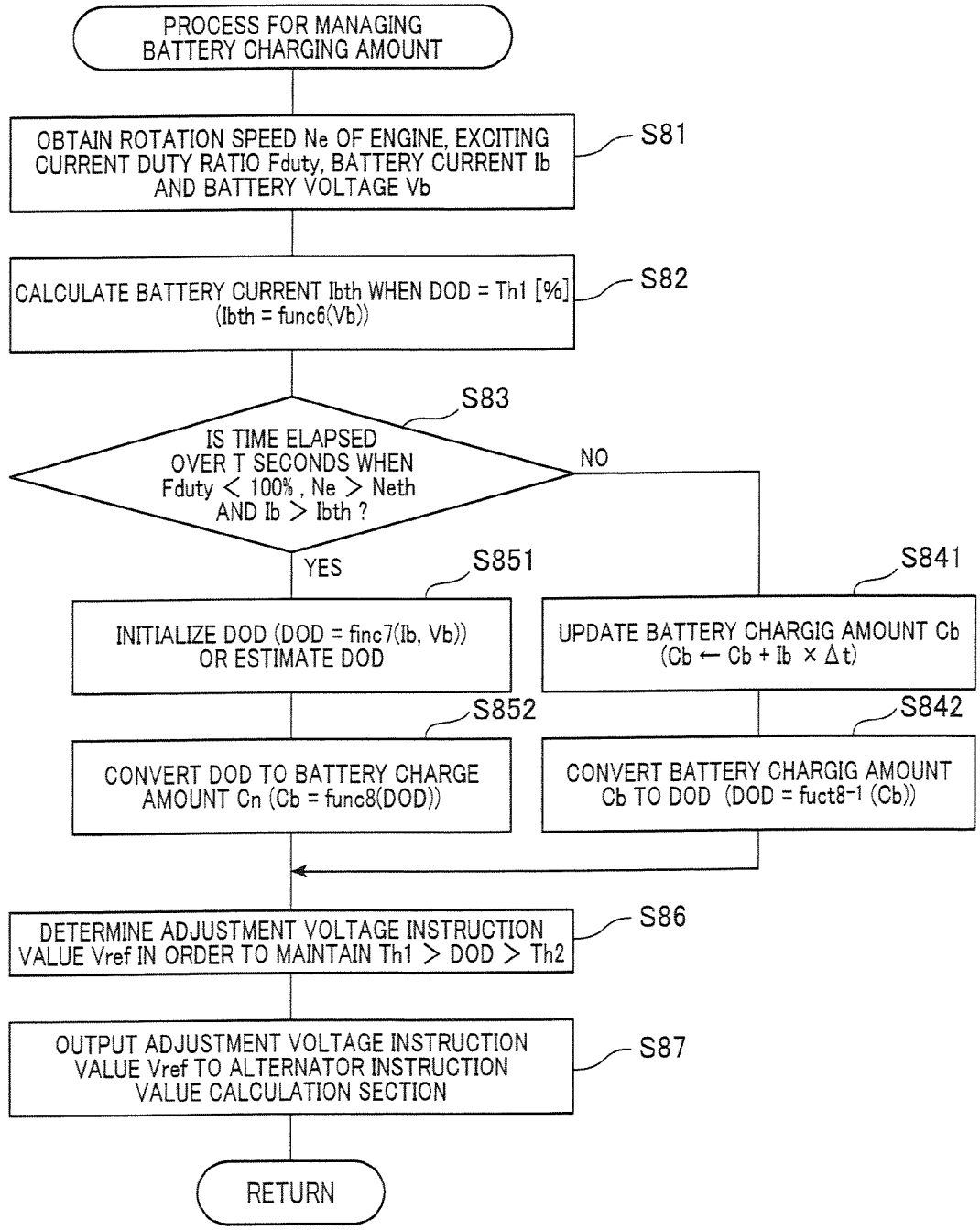
FIG. 5 is a view showing a flow chart of a process for managing a charge amount of the battery 30 performed by the arithmetic device 13 which works as a battery charge amount management section 80 according to the first exemplary embodiment shown in FIG. 1.

FIG. 5 is a view showing a flow chart of a process for managing a charge amount of the battery 30 performed by the arithmetic device 13 which works as the battery charge amount management section 80 according to the first exemplary embodiment shown in FIG. 1.

In the routine of the battery charge amount management process indicated by the flow chart shown in FIG. 5, the battery charge amount management section 80 repeatedly calculates an adjustment voltage instruction value Vref every predetermined period by the battery charge management process indicated by the flow chart shown in FIG. 5. Specifically, the battery charge amount management section 80 calculates, as a correlation value, a depth of discharge (DOD) to the full charge of the battery 30.

In order to maintain the residual charge of the battery 30 within a predetermined range on the basis of the adjustment voltage instruction value Vref, the battery charge amount management section 80 determines that a DOD corresponding to the lower limit value of the predetermined range is designated by reference character Th1, and a DOD corresponding to the upper limit value of the predetermined range is designated by reference character Th2. Accordingly, the battery charge amount management section 80 calculates the adjustment voltage instruction value Vref to satisfy a relationship of Th1>DOD>Th2.

That is, in step S81 of the basis of the battery charge amount management process shown in FIG. 5, the battery charge amount management section 80 obtains the engine rotation speed Ne, the exciting current duty ratio Fduty, the battery current Ib, and the battery voltage Vb in step S81. The operation flow goes to step S82.

In step S82, the battery charge amount management section 80 calculates a battery current Ibth at Th1 of the DOD on the basis of the obtained battery voltage Vb. For example, a map stores in advance the characteristics of a relationship Ibth-Vb obtained by performing various experiments. The battery charge amount management section 80 calculates the battery current Ibth on the basis of the battery voltage Vb by using the map. The operation flow goes to step S83.

In step S83, the battery charge amount management section 80 judges whether or not the DOD is increased to Th1, i.e. which is decreased to the lower limit value on the basis a judgment result whether or not the obtained battery current Ib exceeds Tbth. The more the DOD increases, the more the current charge of the battery 30 is increased. As a result, the battery current Ib becomes increased.

When a first condition and a second condition are satisfied and a relationship of Ib>Tbth is satisfied, the battery charge amount management section 80 determines that the condition DOD>Th1 is satisfied. The first condition indicates that no excess power supply to the on-vehicle device 31 occurs and the electric power generation amount is not saturated. For example, the battery charge amount management section 80 judges that the first condition is satisfied when Fduty<100%.

The second condition indicates a state when spark ignition is completed or when the engine is running normally. For example, the battery charge amount management section 80 determines the occurrence of the second condition when the rotation speed Ne of the engine is not less than a predetermined value Neth for a period of not less than T seconds.

When the judgment result in step S83 indicates negation ("NO" in step S83), i.e. when indicating that DOD does not reach Th1, the operation flow goes to step S841. In step S841, the battery charge amount management section 80 adds a charge amount Ib×$\Delta$t, which corresponds to the obtained battery current Ib, to a battery charge amount Cb in order to update the stored battery charge amount Cb. This battery charge amount Cb is stored into a non-volatile memory or a non-volatile storage as the memory section.

The battery charge amount management section 80 used, as an initial value, the final value of the battery charge amount Cb obtained by the battery charge amount management process previously performed. The operation flow goes to step S842.

In step S842, the battery charge amount management section 80 converts the calculated battery charge amount Cb to the DOD. The operation flow goes to step S86. The process in step S82 will be explained later.

On the other hand, when the judgment result in step S83 indicates affirmation ("YES" in step S83), i.e. when indicating that DOD reaches Th1, the operation flow goes to step S851. In step S851, the battery charge amount management section 80 performs the initialization of DOD, i.e. sets Th1 to DOD, and estimates DOD on the basis of the obtained battery current Ib and the obtained battery voltage Vb and performs the initialization of DOD. The operation flow goes to step S852.

In step S852, the battery charge amount management section 80 converts the obtained DOD to the battery charge amount Cb. The operation flow goes to step S86.

In step S86, the battery charge amount management section 80 determines a charge maintain component VDC in order to maintain the relationship of Th1>DOD>Th2. For example, the relationship between the adjustment voltage instruction value Vref and the DOD are detected in advance and stored in the memory section. The battery charge amount management section 80 calculates the adjustment voltage instruction value Vref by using the map stored in the memory section.

That is, the battery charge amount management section 80 estimates the DOD on the basis of the battery current Ib and the battery voltage Vb in the processes of steps S83, S841, S842, S851 and S852. When Ib=Ibth ("YES" in step S83), the operation flow goes to step S851. In step S851, the battery charge amount management section 80 initializes the DOD estimation value with the value Th1 or the Th1 estimation value. This process makes it possible to suppress the estimation error of the DOD from being increased. The operation flow goes to step S87.

In step S87, the battery charge amount management section 80 outputs the calculated charge maintain component VDC and the estimated DOD to the alternator instruction value calculation section 90. The battery charge amount management section 80 completes the routine designated by the flow chart shown in FIG. 5.

Although the battery charge amount management section 80 calculates the adjustment voltage instruction value Vref in order to increase the accuracy on the basis of the DOD estimation result in the processes previously described, it is possible to use a constant voltage value as the adjustment voltage instruction value Vref. This maintains the DOD at a value corresponding to the adjustment voltage instruction value Vref. Accordingly, it is possible to increase the accuracy only by using an optimum constant value of the adjustment voltage instruction value Vref. That is, it is possible for the battery charge amount management section 80 to realize the function by using a simple method of using such a constant voltage value instead of the calculated adjustment voltage instruction value Vref.

A description will now be given of the alternator instruction value calculation section 90 performed by the alternator instruction value calculation section 90 with reference to FIG. 6 and FIG. 7. The alternator instruction value calculation section 90 has the function having the structure shown in FIG. 6.

Figure 6:
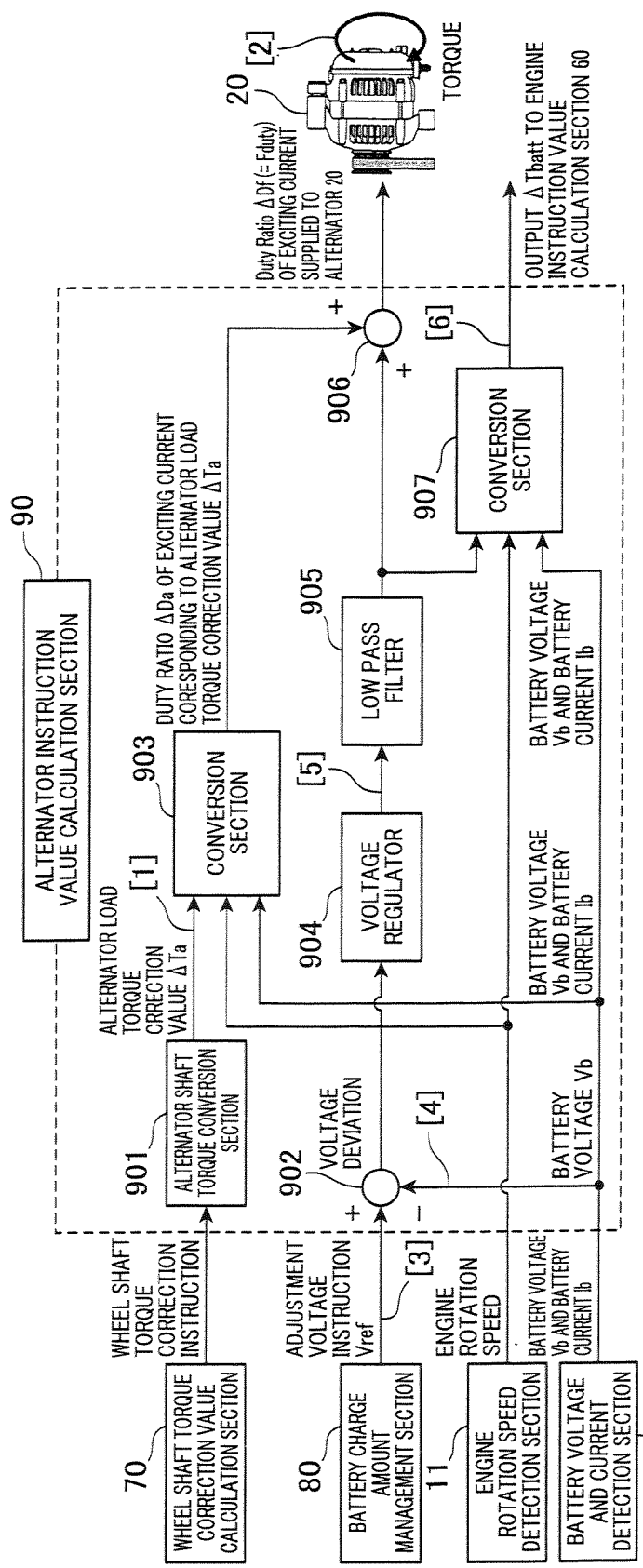
FIG. 6 is a view showing a block diagram of functions of an alternator instruction value calculation section according to the first exemplary embodiment shown in FIG. 1.

FIG. 6 is a view showing a block diagram of functions of the alternator instruction value calculation section 90 according to the first exemplary embodiment shown in FIG. 1. FIG. 7 is a view showing a flow chart of the process of calculating alternator instruction values performed by the alternator instruction value calculation section 90 as the arithmetic device 13 according to the first exemplary embodiment shown in FIG. 1.

Figure 7:
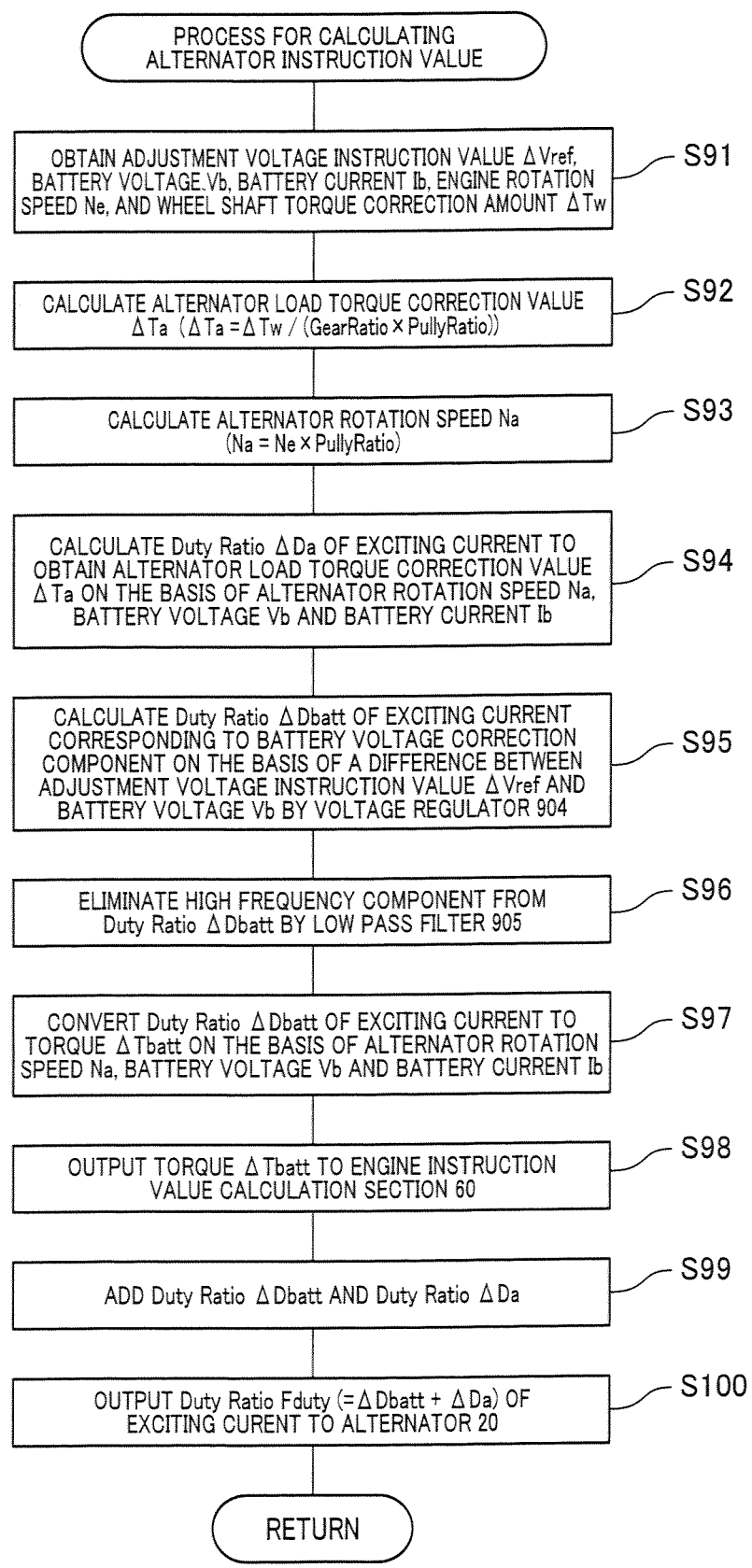
FIG. 7 is a view showing a flow chart of a process of calculating alternator instruction values performed by the arithmetic device 13 which works as an alternator instruction value calculation section 90 according to the first exemplary embodiment shown in FIG. 1.

As shown in FIG. 7, the alternator instruction value calculation section 90 performs the alternator instruction value calculation in which the duty ratio Fduty of the exciting current to the alternator 20 and the the consumption electric power torque ΔTbatt corresponding to the power consumption of the on-vehicle device 31 are repeatedly calculated every predetermined period. In particular, the alternator instruction value calculation section 90 according to the first exemplary embodiment calculates the duty ratio Fduty of the exciting current by adding the battery voltage correction component and a vibration suppression component and using the sum as the exciting current.

That is, in step S91 shown in FIG. 7, the alternator instruction value calculation section 90 obtains the adjustment voltage instruction value Vref, the battery voltage Vb, the battery current Ib, the engine rotation number Ne, the wheel shaft torque correction value ΔTw. The operation flow goes to step S92.

In step S92, an alternator shaft torque conversion section 901 (see FIG. 6) in the alternator instruction value calculation section 90 calculates an alternator load torque correction value ΔTa. In the process in step S92, the alternator shaft torque conversion section 901 calculates the alternator load torque correction value ΔTa on the basis of a reduction gear ratio of the driver shaft, a pulley ratio of a drive belt of the alternator 20 and the wheel shaft torque correction value ΔTw. The operation flow goes to step S93.

In step S93, a conversion section 903 in the alternator instruction value calculation section 90 has a function of converting an exciting current duty ratio to a torque. The conversion section 903 calculates a rotation speed Na of the alternator 20 by multiplying the rotation speed Ne of the engine 10 and the pulley ratio. The operation flow goes to step S94.

In step S94, the torque-exciting current duty ratio conversion section 903 calculates the duty ratio ΔDa of the exciting current to obtain the alternator load torque correction value ΔTa on the basis of the rotation speed Ne of the alternator 20, the battery voltage Vb and the battery current Ib. The operation flow goes to step S95.

In step S95, a subtracter 902 in the alternator instruction value calculation section 90 calculates a difference between the adjustment voltage instruction value Vref and the battery voltage Vb.

A voltage regulator 904 in the alternator instruction value calculation section 90 calculates a duty ratio ΔDbatt of the exciting current corresponding to the battery voltage correction value. The voltage regulator 904 has the function to generate the duty ratio which corresponds to a magnitude of the input voltage. The operation flow goes to step S96.

In step S96, a low pass filter 905 in the alternator instruction value calculation section 90 receives the duty ratio ΔDbatt and eliminates a high frequency component from the duty ratio ΔDbatt. The operation flow goes to step S97.

In step S97, a conversion section 907 in the alternator instruction value calculation section 90 has a function for converting the duty ratio of the exciting current to a torque. The conversion section 907 converts the duty ratio ΔDbatt of the exciting current corresponding to the battery voltage correction value to the consumption electric power torque ΔTbatt on the basis of the rotation speed Ne of the alternator 20, the battery voltage Vb and the battery current Ib.

In the process in step S97, the conversion section 907 calculates a current value generated in the alternator 20 on the basis of a map which is prepared in advance and indicates the relationship between the duty ratio of the exciting current and the rotation speed Ne of the alternator 20. The conversion section 907 subtracts the battery current Ib from the calculated current value. The current value obtained by the subtraction indicates the current flowing in the on-vehicle device 31. The conversion section 907 calculates the consumption electric power torque ΔTbatt by dividing a first product by a second product, where the first product is obtained by multiplying the battery voltage Vb and the current value flowing in the on-vehicle device 31, and the second product is obtained by multiplying an efficiency (which is a known value) of the alternator 20 and the rotation speed Ne of the alternator 20. By the way, the duty ratio ΔDa of the exciting current calculated by the process in step S94 can be obtained by performing an inverse operation of the above operation. The operation flow goes to step S98.

In step S98, the alternator instruction value calculation section 90 outputs the consumption electric power torque ΔTbatt to the engine instruction value calculation section 60. The operation flow goes to step S99.

In step S99, an adder 906 in the alternator instruction value calculation section 90 adds the duty ratio ΔDbatt of the exciting current transmitted from the low pass filter 905 and the duty ratio ΔDa of the exciting current (which corresponds to the alternator load torque correction value ΔTa obtained in step S92). The operation flow goes to step S100.

In step S100, the alternator instruction value calculation section 90 outputs the addition value obtained in step S99, as the duty ratio Fduty of the exciting current to the alternator 20. The alternator instruction value calculation section 90 completes the routine indicated by the flow chart shown in FIG. 7.

Effects of the First Exemplary Embodiment

In the electric power generation control system 1 according to the first exemplary embodiment previously described, the arithmetic device 13 obtains the vehicle states which contain the battery conditions and the vehicle states of the motor vehicle (as a host vehicle equipped with the electric power control system 1 according to the first exemplary embodiment). The arithmetic device 13 calculates the charging parameters and the vibration suppression component on the basis of the vehicle states. For example, the arithmetic device 13 calculates, as the charging parameters, the duty ratio ΔDbatt of the exciting current corresponding to the battery voltage correction value, which is necessary for maintaining the residual charge of the battery 30 within the predetermined range. A second exemplary embodiment uses the consumption electric power torque ΔTbatt as the charging parameter, and a third exemplary embodiment uses a value Vrefu as the charging parameters, and which will be explained later. Further, the arithmetic device 13 calculates, as the vibration suppression parameter, the duty ratio ΔDa of the exciting current which is necessary for suppressing the vibration of the motor vehicle (as the host vehicle). The second exemplary embodiment uses the alternator load torque correction value ΔTa as the as the vibration suppression parameter which will be explained later.

The arithmetic device 13 determines the exciting current to be supplied to the excitation winding of the alternator 20.

Because the electric power generation system 1 previously described does not control the output current from the alternator 20, and controls and adjusts the exciting current flowing in the excitation winding of the alternator 20 on the basis of the charging parameters and the vibration suppression parameter, it is possible to supply the electric power supply to the battery 30 and to suppress the vibration of the motor vehicle by a simple structure.

Figure 8:
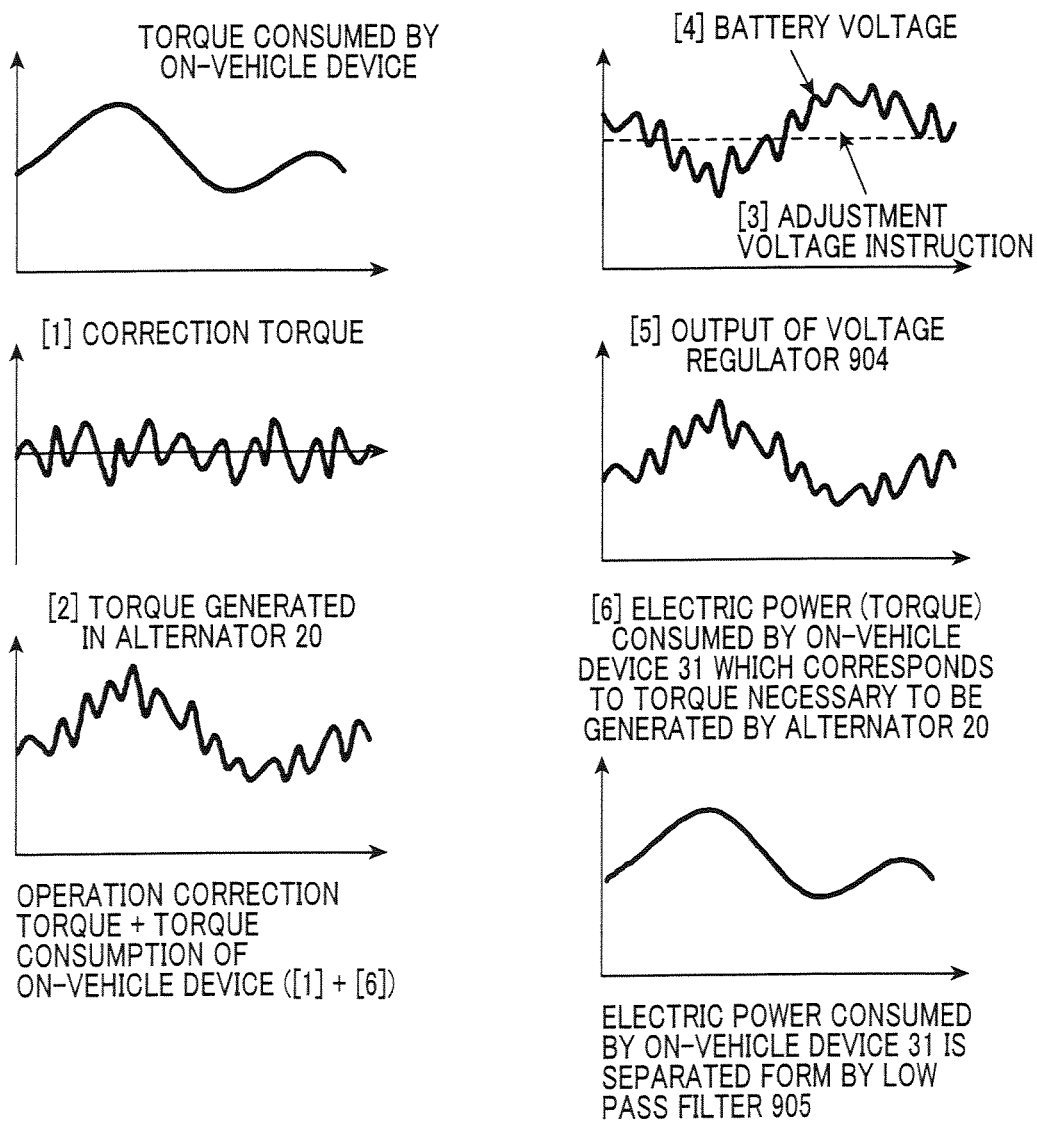
FIG. 8 is a view showing graphs of a torque, a voltage waveform, etc. used in the electric power generation control system 1 according to the first exemplary embodiment shown in FIG. 1.

FIG. 8 is a view showing graphs of a torque, a voltage waveform, etc. used in the electric power generation control system 1 according to the first exemplary embodiment shown in FIG. 1.

As shown in FIG. 8, the electric power generation control system 1 according to the first exemplary embodiment can correspond the electric power to be consumed by the on-vehicle device 31 with the torque [6] (see FIG. 8) which is necessary for the alternator 20 on the basis of the consumed electric power. It is possible to generate the torque [2] generated by the alternator 20, to which the correction torque [1] to correct the vibration component is added. At this time, it is possible to approximately correspond the battery voltage [4] to the adjustment voltage instruction value Vref.

The arithmetic device 13 in the electric power generation control system 1 obtains the voltage value of the battery 30, and calculates the charging parameters on the basis of the voltage value of the battery 30. The low pass filter 905 eliminates a high frequency component from the voltage value of the battery 3 and the charging parameters. The arithmetic device 13 uses the charging parameters after the elimination of the high frequency component, (such as the duty ratio ΔDbatt of the exciting current corresponding to the battery voltage correction value).

The frequency component of the control amount to be supplied to the alternator 20 is generally lower than the frequency of the vibration suppression parameter so that the residual charge of the battery 30 is maintained within the reference range.

Because the voltage of the battery 30 is easily affected by the vibration suppression parameter when the voltage of the battery 30 is feedback to the charging parameters, the low pass filter 905 in the arithmetic device 13 according to the first exemplary embodiment eliminates the high frequency component from the voltage of the battery 30 and the charging parameters.

The electric power generation control system 1 according to the first exemplary embodiment can suppress influence caused by the high frequency component during the execution of the feedback control of the battery voltage of the battery 30. This makes it possible to provide the correct instruction to supply the optimum exciting current to the excitation winding of the alternator 20.

Second Exemplary Embodiment

A description will now be given of the electric power generation control system according to a second exemplary embodiment with reference to FIG. 9 and FIG. 10.

The following description will explain a difference between the second exemplary embodiment and the first exemplary embodiment, and the same components between the second exemplary embodiment and the first exemplary embodiment will be referred with the same reference numbers and characters for brevity.

Figure 9:
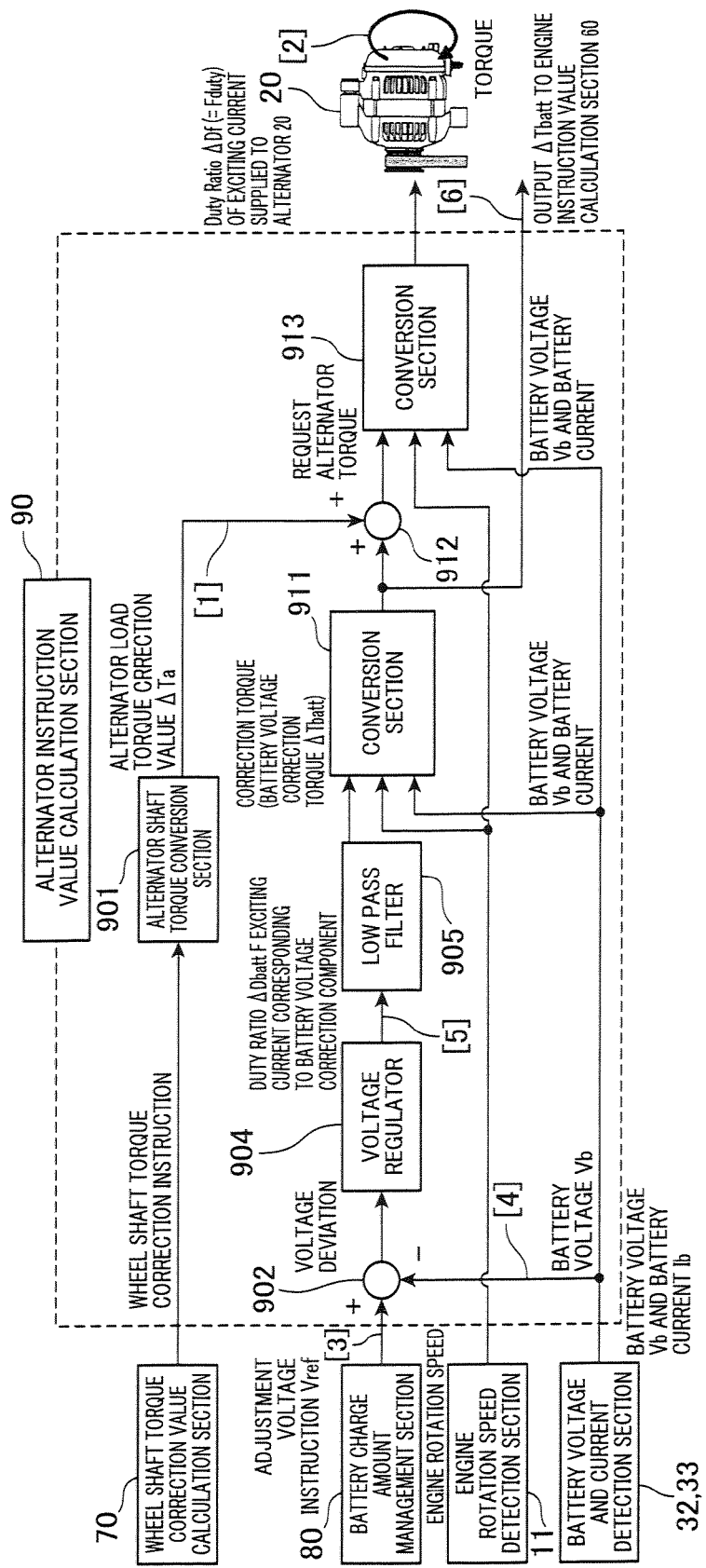
FIG. 9 is a view showing a block diagram of functions of the alternator instruction value calculation section according to a second exemplary embodiment of the present invention.

FIG. 9 is a view showing a block diagram of the alternator instruction value calculation section 90 as the function of the arithmetic device 13 according to the second exemplary embodiment.

Figure 10:
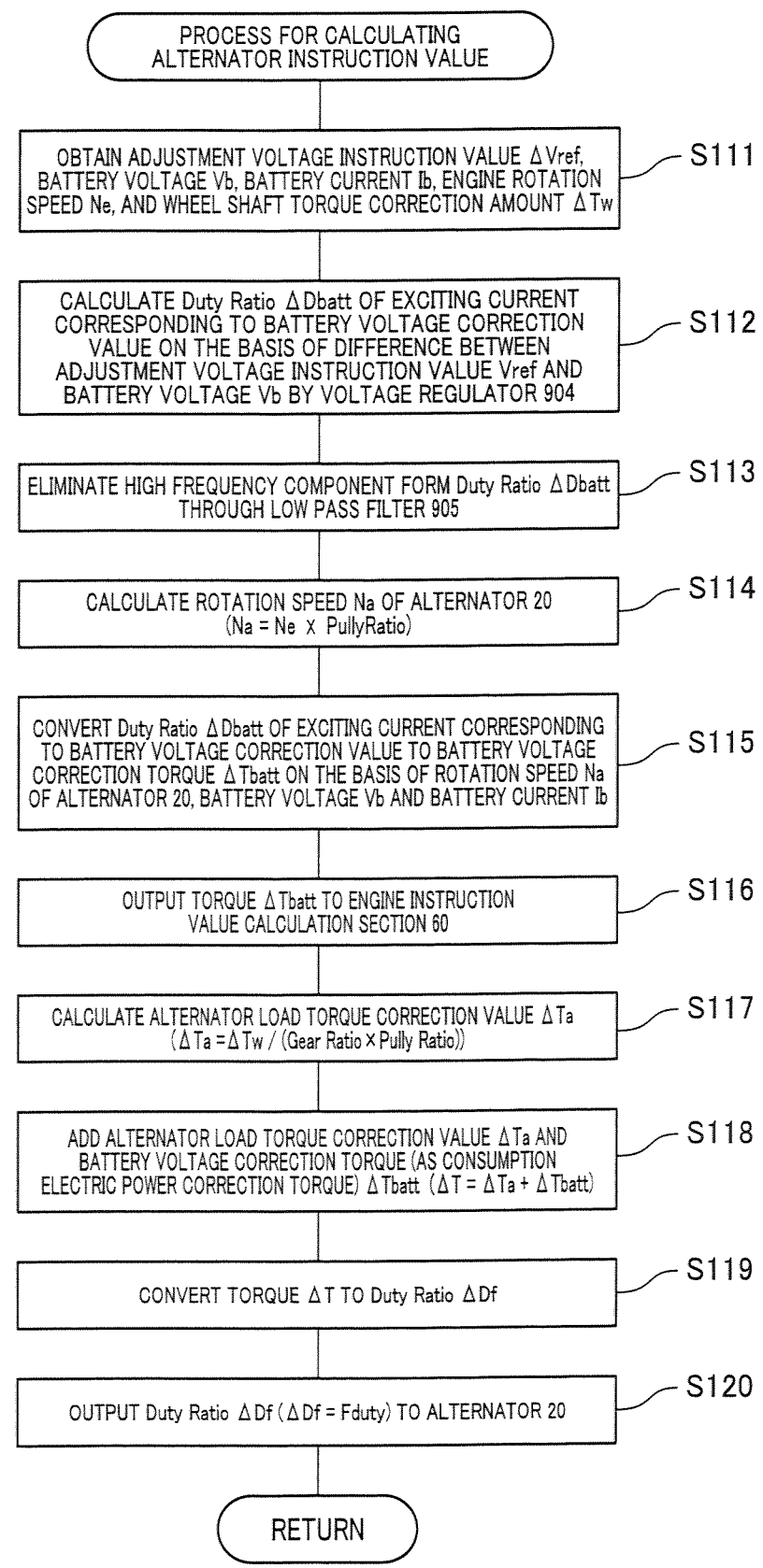
FIG. 10 is a view showing a flow chart of a process of calculating alternator instruction values performed by the arithmetic device 13 which works as the alternator instruction value calculation section according to the second exemplary embodiment shown in FIG. 9.

FIG. 10 is a view showing a flow chart of a process of calculating alternator instruction values performed by the arithmetic device 13 as the alternator instruction value calculation section 90 according to the second exemplary embodiment shown in FIG. 9.

Like the process in the first exemplary embodiment previously described, the arithmetic device 13 repeatedly calculates the duty ratio Fduty of the exciting current for the alternator 20 and the consumption electric power torque ΔTbatt which corresponds to the electric power consumption every predetermined period. In the second exemplary embodiment, the battery voltage correction component and the vibration suppression components are added as a torque, and the obtained torque is converted to the exciting current in order to obtain the duty ratio Fduty of the exciting current.

In step S111 shown in FIG. 10, the alternator instruction value calculation section 90 obtains the adjustment voltage instruction value Vref, the battery voltage Vb, the battery current Ib, the engine rotation number Ne, the wheel shaft torque correction value ΔTw. The operation flow goes to step S112.

In step S112, the subtracter 902 in the alternator instruction value calculation section 90 calculates a difference between the adjustment voltage instruction value Vref and the battery voltage Vb. The voltage regulator 904 in the alternator instruction value calculation section 90 calculates a duty ratio ΔDbatt of the exciting current corresponding to the battery voltage correction value. The voltage regulator 904 outputs the generated duty ratio ΔDbatt to the low pass filter 905. The operation flow goes to step S113.

In step S113, the low pass filter 905 in the alternator instruction value calculation section 90 eliminates a high frequency component from the duty ratio ΔDbatt of the exciting current. The operation flow goes to step S114.

In step S114, a conversion section 911 in the alternator instruction value calculation section 90 has the function of converting the exciting current duty ratio to the torque. The conversion section 911 calculates a rotation speed Na of the alternator 20. The operation flow goes to step S115.

In step S115, the conversion section 911 in the alternator instruction value calculation section 90 has a function of converting the exciting current duty ratio to the torque. The conversion section 911 converts the exciting current duty ratio ΔDbatt corresponding to the battery voltage correction component to a battery voltage correction torque (as the consumption electric power torque) ΔTbatt. The operation flow goes to step S116.

In step S116, the alternator instruction value calculation section 90 outputs the calculated battery voltage correction torque (as the consumption electric power torque) ΔTbatt to the engine instruction value calculation section 60. The operation flow goes to step S117.

In step S117, the alternator shaft torque conversion section 901 in the alternator instruction value calculation section 90 calculates an alternator load torque correction value ΔTa. In the process in step S117, the alternator shaft torque conversion section 901 calculates the alternator load torque correction value ΔTa on the basis of the reduction gear ratio of the driver shaft, the pulley ratio of the drive belt of the alternator 20 and the wheel shaft torque correction value ΔTw. The operation flow goes to step S118.

In step S118, an adder 912 in the alternator instruction value calculation section 90 calculates a torque ΔT by adding the battery voltage correction torque (or the consumption electric power torque) ΔTbatt and the alternator load torque correction value ΔTa. The operation flow goes to step S119.

In step S119, a conversion section 913 in the alternator instruction value calculation section 90 has a function of converting the torque to the duty ratio of the exciting current. The conversion section 913 converts the torque ΔT to the duty ratio ΔDf of the exciting current on the basis of the rotation speed Na of the alternator 20, the battery voltage Vb and the battery current Ib. The operation flow goes to step S120.

By the way, the processes in step S114 and step S119 shown in FIG. 10 in the second exemplary embodiment are the same as the processes in step S97 and step S94 shown in FIG. 7 in the first exemplary embodiment.

In step S120, the alternator instruction value calculation section 90 outputs the duty ratio ΔDf of the exciting current to the alternator 20 in order to achieve the torque ΔT, where the duty ratio ΔDf of the exciting current corresponds to the duty ratio Fduty of the exciting current for the alternator 20. The alternator instruction value calculation section 90 completes the execution of the routine designated by the flow chart shown in FIG. 10.

Third Exemplary Embodiment

A description will now be given of the electric power generation control system according to a third exemplary embodiment with reference to FIG. 11, FIG. 12 and FIG. 13.

Figure 11:
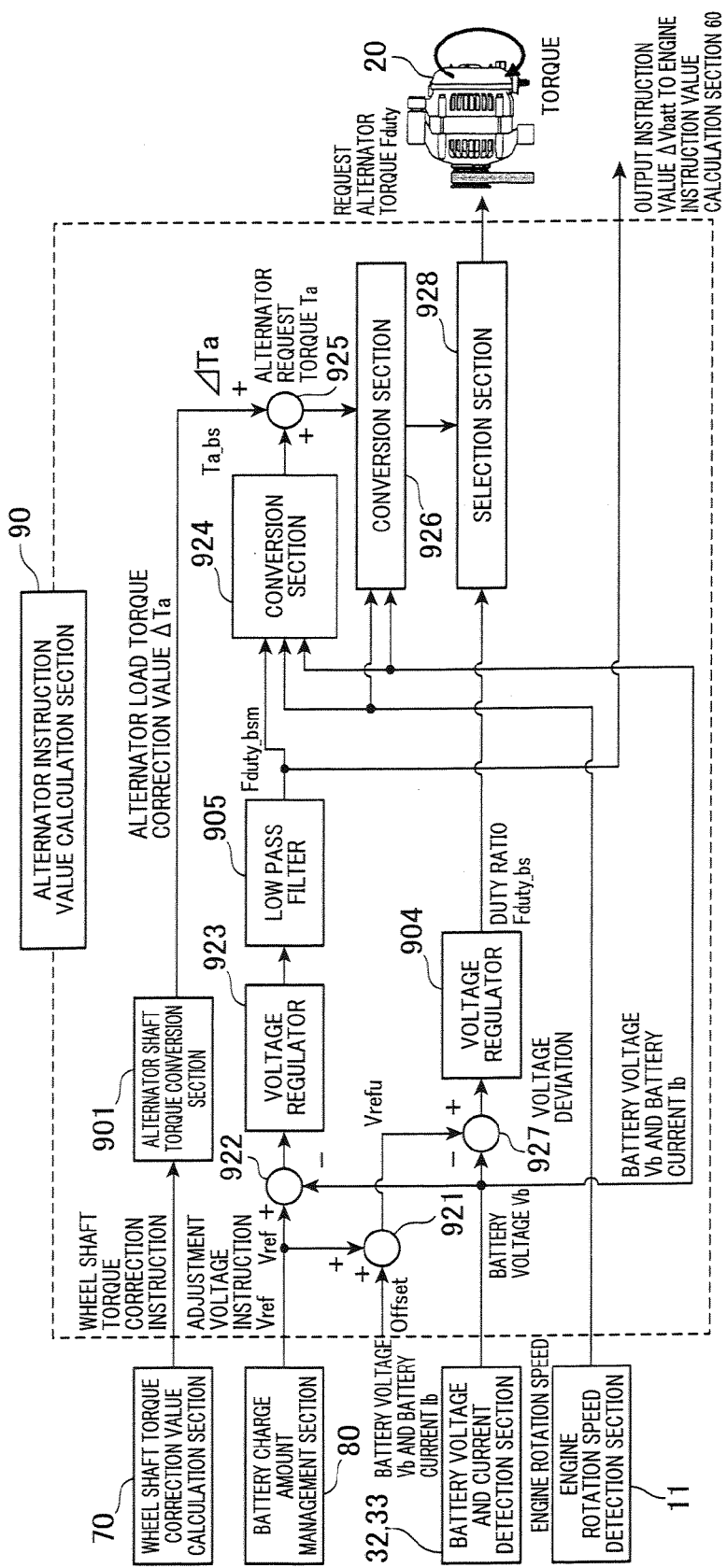
FIG. 11 is a view showing a block diagram of functions of the alternator instruction value calculation section according to a third exemplary embodiment of the present invention.

FIG. 11 is a view showing a block diagram of functions of the alternator instruction value calculation section in the arithmetic device 13 according to the third exemplary embodiment. FIG. 12 is a view showing a flow chart of a process of calculating alternator instruction values performed by the arithmetic device 13 which works as the alternator instruction value calculation section 90 according to the third exemplary embodiment shown in FIG. 11.

Figure 12:
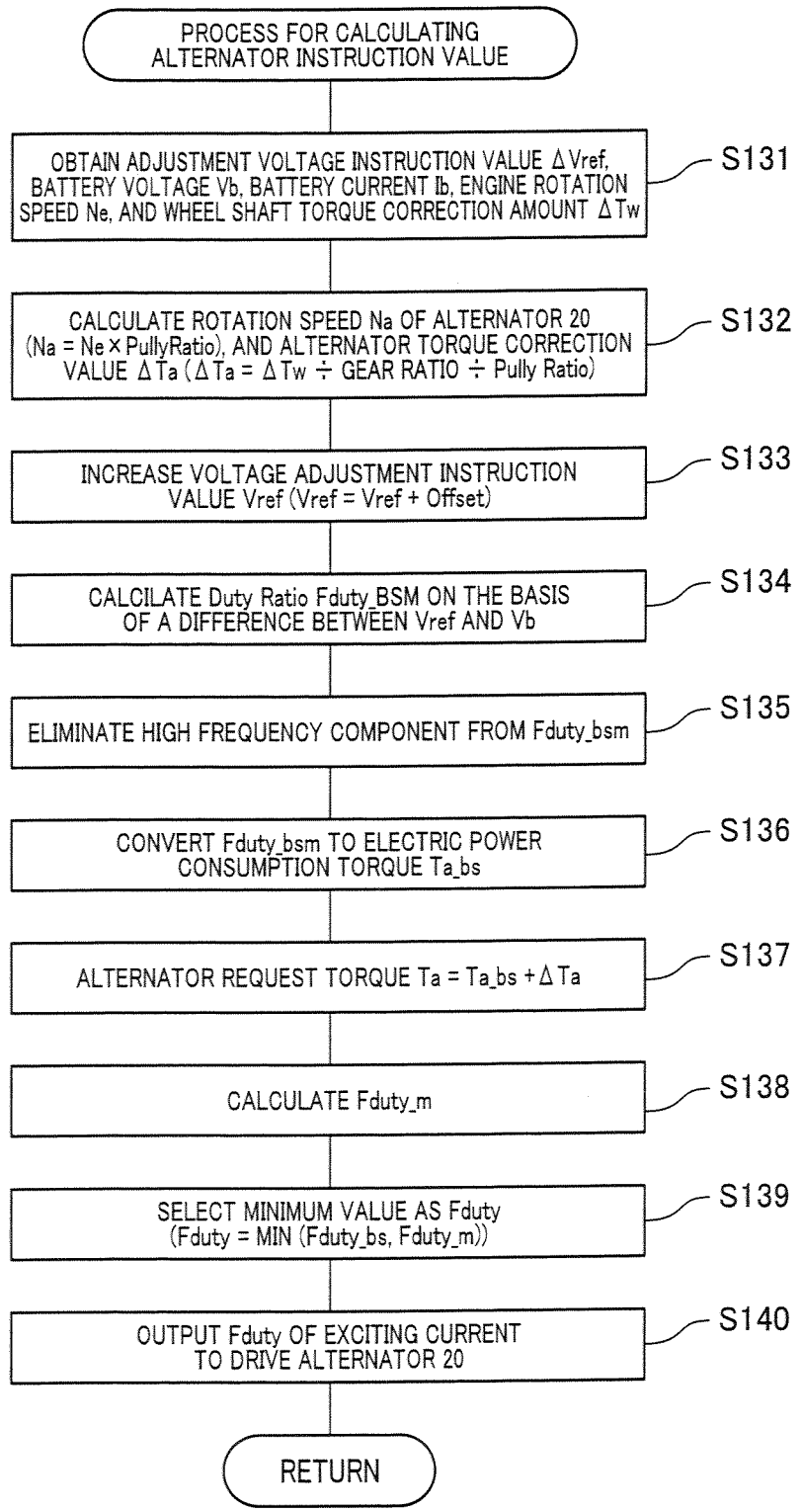
FIG. 12 is a view showing a flow chart of a process of calculating alternator instruction values performed by the arithmetic device 13 which works as the alternator instruction value calculation section according to the third exemplary embodiment shown in FIG. 11.

The alternator instruction value calculation section 90 according to the third exemplary embodiment performs the alternator instruction value calculation process shown in FIG. 12 in a case when it is possible to determine the upper limit of the duty ratio Fduty of the exciting current outputted from the voltage regulator 904, but not possible to directly determine the duty ratio Fduty of the exciting current outputted from the voltage regulator 904.

In step S131, the alternator instruction value calculation section 90 obtains the adjustment voltage instruction value Vref, the battery voltage Vb, the battery current Ib, the engine rotation number Ne, the wheel shaft torque correction value ΔTw. The operation flow goes to step S132.

In step S132, the alternator shaft torque conversion section 901 (see FIG. 11) in the alternator instruction value calculation section 90 calculates an alternator load torque correction value ΔTa. In the process in step S132, the alternator shaft torque conversion section 901 calculates the alternator load torque correction value ΔTa on the basis of a reduction gear ratio of the driver shaft, a pulley ratio of a drive belt of the alternator 20 and the wheel shaft torque correction value ΔTw. The operation flow goes to step S133.

In step S133, an adder 921 adds a constant value as an offset value Offset to the adjustment voltage instruction value Vref. The adder 921 outputs the increased adjustment voltage instruction value Vrefu.

The offset value Offset is a constant value which is larger than an amplitude of an exciting current (as a vibration-suppression current value) which corresponds to the alternator load torque correction value ΔTa.

A subtracter 927 in the alternator instruction value calculation section 90 calculates a difference between the increased adjustment voltage instruction value Vrefu and the battery voltage Vb. The voltage regulator 904 calculates the duty ratio Fduty_bs which corresponds to the increased adjustment voltage instruction value Vrefu. The operation flow goes to step S134.

In step S134, the subtracter 922 in the alternator instruction value calculation section 90 calculates a difference between the adjustment voltage instruction value Vref and the battery voltage Vb. A voltage regulator model 923 in the alternator instruction value calculation section 90 calculates the duty ratio Fduty_bsm of the exciting current which corresponds to the adjustment voltage instruction value Vref on the basis of the calculated difference. Similar to the voltage regulator 904 previously described, the voltage regulator model 923 has a function of generating the duty ratio of the exciting current which corresponding to the input voltage. The operation flow goes to step S135.

In step S135, the low pass filter 905 in the alternator instruction value calculation section 90 receives the duty ratio Fduty_bsm and eliminates a high frequency component from the duty ratio Fduty_bsm and outputs an instruction value ΔVbatt to the engine instruction value calculation section 60. The operation flow goes to step S136.

In step S136, a conversion section 924 in the alternator instruction value calculation section 90 has a function for converting the duty ratio of the exciting current to a torque. The conversion section 924 converts the duty ratio Fduty_bsm of the exciting current corresponding to the battery voltage correction value, as a reference value, to an electric power consumption torque Ta_bs on the basis of the rotation speed Ne of the alternator 20, the battery voltage Vb and the battery current Ib. The operation flow goes to step S137.

In step S137, an adder 925 in the alternator instruction value calculation section 90 adds the electric power consumption torque Ta_bs and the alternator load torque correction value ΔTa and outputs the sum as the alternator request torque Ta as the addition result. The operation flow goes to step S138.

In step S138, a conversion section 926 in the alternator instruction value calculation section 90 has a function for converting the duty ratio of the exciting current to a torque. The conversion section 926 calculates the upper limit value Fduty_m of the duty ration of the exciting current in order to achieve the alternator request torque Ta.

A minimum value selection section 928 in the alternator instruction value calculation section 90 selects a small value in the upper limit value Fduty_m of the duty ration of the exciting current and the duty ratio Fduty_bs of the exciting current corresponding to the adjustment voltage instruction value Vrefu. The minimum value selection section 928 outputs the selected small value as the duty ratio Fduty of the exciting current for the alternator 20. The operation flow goes to step S140.

In step S140, the alternator instruction value calculation section 90 outputs the duty ratio Fduty of the exciting current to the alternator 20. The alternator instruction value calculation section 90 completes the execution of the routine designated by the flow chart according to the third exemplary embodiment shown in FIG. 12.

The minimum value selection section 928 has the function of outputting the minimum value in the inputted values. Because the increased adjustment voltage instruction value Vrefu is an increased value as previously described, the minimum value selection section 928 always outputs the value which corresponds to the upper limit value Fduty_m of the exciting current as the duty ratio Fduty of the exciting current to the alternator 20.

Figure 13:
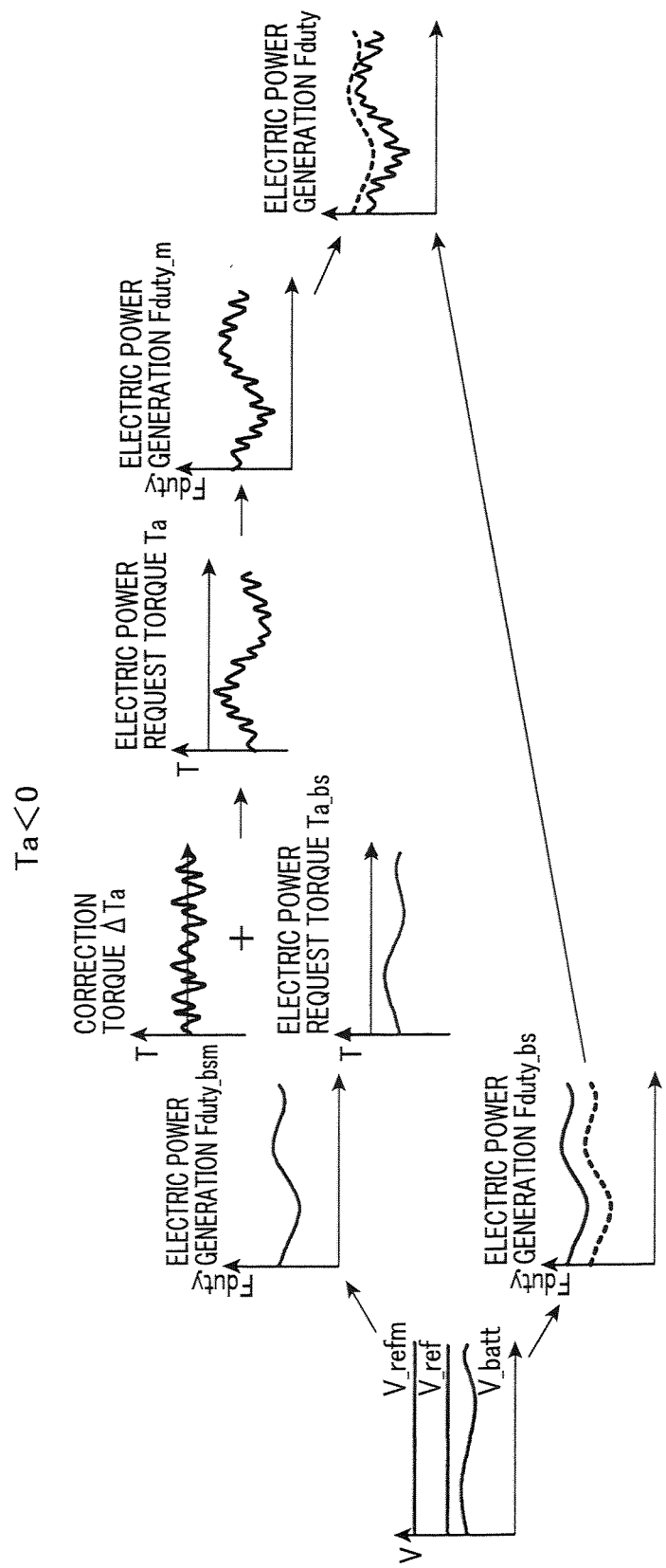
FIG. 13 is a view showing graphs of a torque, a voltage waveform, etc. used in the electric power generation control system 1 according to the third exemplary embodiment of the present invention.

FIG. 13 is a view showing graphs of a torque, a voltage waveform, etc. used in the electric power generation control system 1 according to the third exemplary embodiment.

As shown in FIG. 13, the alternator instruction value calculation section 90 in the arithmetic device 13 according to the third exemplary embodiment suppresses the duty ratio Fduty_bs of the exciting current corresponding to the adjustment voltage instruction value Vrefu which is increased in advance from the upper limit value Fduty_m of the duty ratio of the exciting current which is obtained considering the correction torque ΔTa and the electric power consumption torque Ta_bs.

Accordingly, even if the duty ratio Fduty_bs of the exciting current corresponding to the increased adjustment voltage instruction value Vrefu is not directly adjusted, it is possible to indirectly adjust the duty ratio Fduty_bs to an optimum value.

Other Modifications

The concept of the present invention is not limited by the first to third exemplary embodiments, and various modifications can be provided within the range of the concept of the present invention.

For example, the functions of the arithmetic device 13 are achieved by running software programs. However, it is possible to use electrical circuits for performing all or a part of these functions. The subject matters recited in the first to third exemplary embodiments are combined and some components can be eliminated to achieve a simple structure without limiting the scope of the present invention.

Correspondence Between the Components and Claims

The arithmetic device 13 used in the first to third exemplary embodiments corresponds to the electric power generation control device used in the claims, and the engine 10 corresponds to an internal combustion engine used in the claims. The alternator 20 corresponds to the electric power generator.

Further, the processes in steps S91, S111, S131 correspond to the vehicle state obtaining section used in the claims. The processes in steps S92-S98, S112-S117 and S132-S137 correspond to the parameter value calculation section used in the claims. The process in step S96 corresponds to the filter section used in the claims. The processes in step S99, S118, S119, S138 and S139 correspond to the exciting current setting section used in the claims.

The processes in step S100, S120 and S140 correspond to the output section used in the claims. The process in step S139 corresponds to the suppression section used in the claims.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power generation control device to be mounted to a motor vehicle, the electric power generation control device controlling an electric power generation of an electric power generator when the electric power generator is driven by an internal combustion engine and supplying the electric power to a battery, the electric power generation control device comprising an electronic control unit including:
means for obtaining a battery state of the battery and a vehicle state of the motor vehicle;
means for calculating charging parameters and vibration suppression parameters, the charging parameters being necessary for maintaining a residual charge of the battery within a predetermined range, and the vibration suppression parameters being necessary for suppressing vibration of the motor vehicle; and means for determining an exciting current to be flowing in an excitation winding of the electric power generator on the basis of the charging parameters and the vibration suppression parameters, wherein the calculating means calculates, as the charging parameters, a maintaining current which is the exciting current necessary for maintaining the residual charge of the battery within the predetermined range, and calculates, as the vibration suppression parameters, a vibration suppression current corresponding to the exciting current converted from a torque of the electric power generator necessary for suppressing vibration of the motor vehicle, and the determining means determines a sum of the maintaining current and the vibration suppression current as the exciting current to be flowing in the excitation winding of the electric power generator.

2. The electric power generation control device according to claim 1, wherein the calculating means calculates, as the charging parameters, an added current which is obtained by adding a constant value to a maintaining current necessary for maintaining the residual charge of the battery with in the predetermined range, and the electric power generation control device further comprises a suppression section which sets the added current to an upper limit which does not exceed the exciting current determined by the determining means.

3. The electric power generation control device according to claim 1, further comprising means for outputting a control signal to the excitation winding of the electric power generator in order to supply the exciting current, which is determined by the determining means, to the excitation winding of the electric power generator.

4. An electric power generation control system to be mounted to a motor vehicle, comprising:
the internal combustion engine;
the electric power generator driven by the internal combustion engine;
the battery which is charged by the electric power generator; and
the electric power generation control device according to claim 1.

5. An electric power generation control device to be mounted to a motor vehicle, the electric power control device controlling an electric power generation of an electric power generator when the electric power generator is driven by an internal combustion engine and supplying the electric power to a battery, the electric power generation control device comprising an electronic control unit including:
means for obtaining a battery state of the battery and a vehicle state of the motor vehicle;

means for calculating charging parameters and vibration suppression parameters, the charging parameters being necessary for maintaining a residual charge of the battery within a predetermined range, and the vibration suppression parameters being necessary for suppressing vibration of the motor vehicle; and means for determining an exciting current to be flowing in an excitation winding of the electric power generator on the basis of the charging parameters and the vibration suppression parameters, wherein the calculating means calculates, as the charging parameters, a maintaining torque of the electric power generation control device which is converted from the exciting current necessary for maintaining the residual charge of the battery within the predetermined range, and calculates, as the vibration parameters, a vibration suppression torque of the electric power generator necessary for suppressing vibration of the motor vehicle, and the determining means determines a sum of the maintaining torque and the vibration suppression torque as a control signal corresponding to the exciting current to be flowing in the excitation winding of the electric power generator.

6. The electric power generation control device according to claim 5, wherein the calculating means calculates, as the charging parameters, an added current which is obtained by adding a constant value to a maintaining current necessary for maintaining the residual charge of the battery with in the predetermined range, and the electric power generation control device further comprises a suppression section which sets the added current to an upper limit which does not exceed the exciting current calculated by the determining means.

7. The electric power generation control device according to claim 5, further comprising a means for outputting a control signal to the excitation winding of the electric power generator in order to supply the exciting current, which is determined by the determining means, to the excitation winding of the electric power generator.

8. An electric power generation control system to be mounted to a motor vehicle, comprising: the internal combustion engine;
the electric power generator driven by the internal combustion engine;
the battery which is charged by the electric power generator; and
the electric power generation control device according to claim 5.

* * * * *